(12) United States Patent
Yang

(10) Patent No.: US 6,246,017 B1
(45) Date of Patent: Jun. 12, 2001

(54) PORTABLE SCALE

(76) Inventor: Ah Mi Yang, P.O. Box 63-99, Taichung (TW), 406

( * ) Notice: Subject to any disclaimer, the term of this patent is extended or adjusted under 35 U.S.C. 154(b) by 0 days.

(21) Appl. No.: 09/425,110

(22) Filed: Oct. 19, 1999

(51) Int. Cl.[7] .............................. G01G 19/56; G01G 3/02
(52) U.S. Cl. ............................. 177/148; 177/232; 177/233
(58) Field of Search ................................. 177/124, 126, 177/127, 128, 131, 148, 149, 168, 169, 232, 233

(56) References Cited

U.S. PATENT DOCUMENTS

| 273,720 | * | 3/1883 | George | 177/232 |
|---|---|---|---|---|
| 739,035 | * | 9/1903 | Triner | 177/233 |
| 756,175 | * | 3/1904 | Meisselbach et al. | 177/232 |
| 1,141,562 | * | 6/1915 | Law | 177/233 |
| 2,488,042 | * | 11/1949 | Thun | 177/232 |
| 2,649,299 | * | 8/1953 | Murphy, Jr. | 177/232 |
| 2,713,982 | * | 7/1955 | Sherbrooke | 177/233 |
| 3,229,780 | * | 1/1966 | Hanssen | 177/233 |
| 4,078,625 | * | 3/1978 | Loeb | 177/233 |
| 4,454,831 | * | 6/1984 | Gallo | 177/233 |
| 4,964,479 | * | 10/1990 | Sumida | 177/233 |
| 5,686,704 | * | 11/1997 | Simser | 177/233 |
| 5,922,999 | | 7/1999 | Yang | 177/148 |

* cited by examiner

Primary Examiner—Randy W. Gibson

(57) ABSTRACT

A scale includes a housing having a cap detachably secured to a lower portion and having a graduation. A stem is engaged through the cap and has a lower hook for engaging with an object to be weighed and includes an upper portion having a head slidably received in the housing for aligning with the graduation and for indicating a weight of the object. A spring may bias the head away from the cap. The head and the spring and the stem may be assembled onto the cap before the cap is secured to the housing, for allowing the scale to be easily and quickly assembled.

12 Claims, 3 Drawing Sheets

PORTABLE SCALE

BACKGROUND OF THE INVENTION

1. Field of the Invention

The present invention relates to a scale, and more particularly to a portable scale.

2. Description of the Prior Art

The closest prior art of which the applicant is aware is her prior U.S. Pat. No. 5,922,999 to Yang, issued on Jul. 13, 1999. Almost all of the typical scales comprise a spring member received in a tubular or longitudinal housing and having one end secured to one end of the housing and having a hook secured to the other end thereof and extended outward of the housing for hooking to an object to be weighed. The members, including the spring members, are required to be secured to both ends of the housing and may not be assembled before securing into the housing, such that the scale may not be easily assembled.

The present invention has arisen to mitigate and/or obviate the afore-described disadvantages of the conventional scales.

SUMMARY OF THE INVENTION

The primary objective of the present invention is to provide a portable scale including a configuration to be easily manufactured and assembled.

In accordance with one aspect of the invention, there is provided a scale comprising a housing including a graduation provided thereon, and including an upper portion and a lower portion, a cap detachably secured to the lower portion of the housing, a stem threaded through the cap and including a lower portion having a hook provided thereon for engaging with an object to be weighed, and including an upper portion slidably received in the housing, a head engaged on the upper portion of the stem and moved in concert with the stem for aligning with the graduation and for indicating a weight of the object, and means for biasing the head and the upper portion of the stem away from the cap.

The stem includes a fastener secured to the upper portion thereof and engaged with the head for preventing the head from being disengaged from the stem. The biasing means includes a spring engaged between the head and the cap. The head includes a shaft extended therefrom and engaged into the spring for straightening the spring.

An indicator is further secured to the head and moved in concert with the head for aligning with the graduation and for indicating the weight of the object. The housing includes a slot formed therein for slidably receiving the indicator. A follower is slidably engaged in the slot of the housing and force-fitted to the housing, and is to be moved along the slot of the housing by the head or by the indicator for aligning with the graduation and for indicating the weight of the object.

The housing includes an opening formed in the upper portion thereof and communicating with the slot of the housing for receiving the follower and for allowing the follower to be engaged into the slot. A plug secured in the upper portion of the housing and engaged with the opening of the housing for shielding the opening of the housing.

A rod and/or a bail are laterally engaged through the upper portion of the housing for hanging purposes. The cap includes a bottom portion having a peripheral lip extended radially outward therefrom for engaging with the housing and for preventing the cap from being engaged into the housing. The bottom portion of the housing includes an inner thread formed therein, the cap includes an outer thread threaded with the inner thread of the housing.

Further objectives and advantages of the present invention will become apparent from a careful reading of a detailed description provided hereinbelow, with appropriate reference to accompanying drawings.

DETAILED DESCRIPTION OF THE PREFERRED EMBODIMENT

Figure 1:
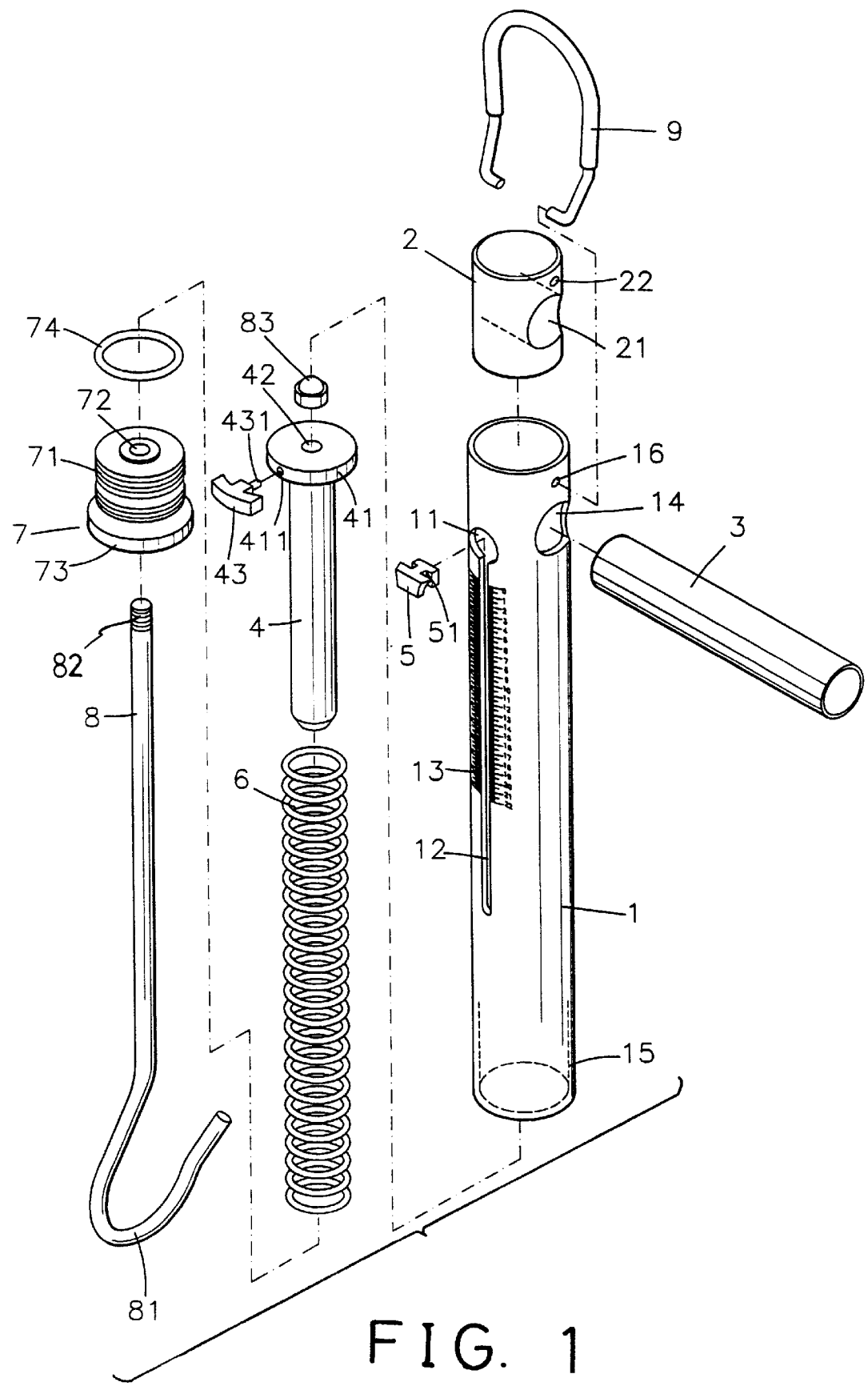
FIG. 1 is an exploded view of a portable scale in accordance with the present invention.
Figure 2:
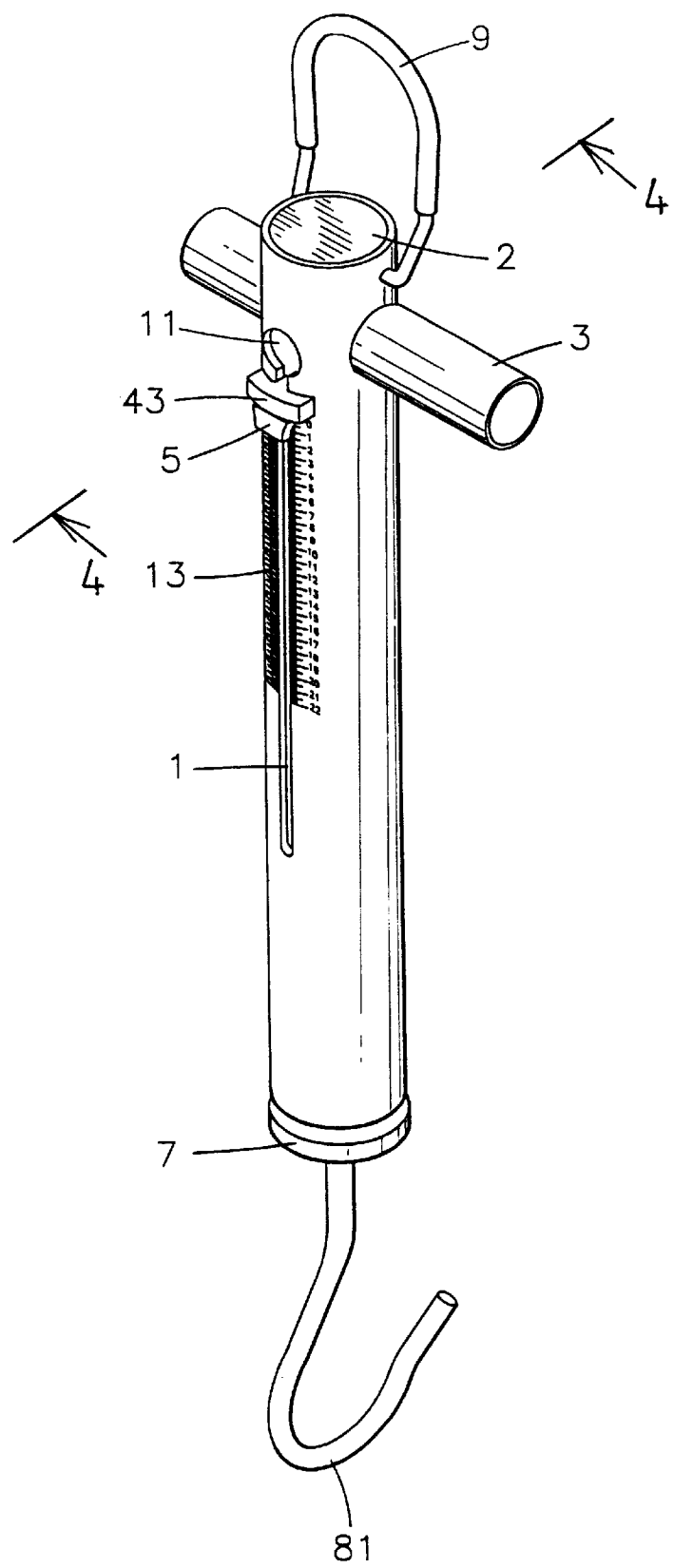
FIG. 2 is a perspective view of the portable scale.
Figure 3:
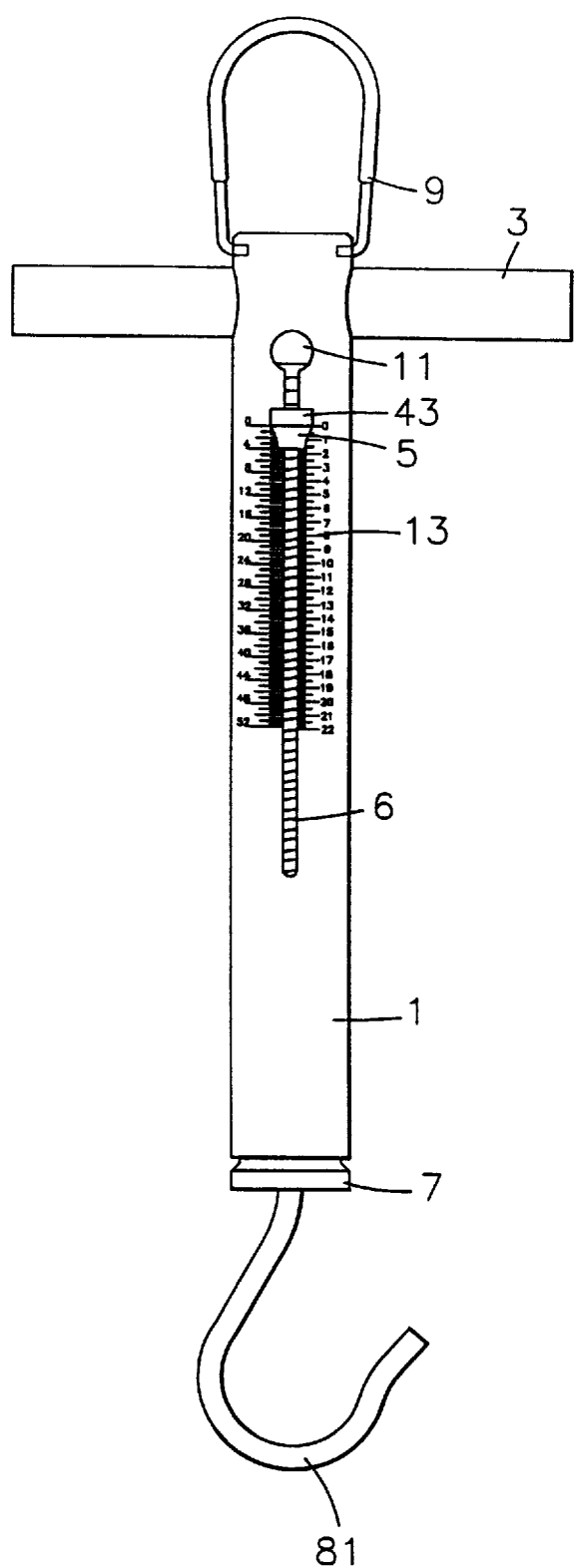
FIG. 3 is a plane view of the portable scale.

Referring to the drawings, and initially to FIGS. 1–3, a portable scale in accordance with the present invention comprises a housing 1, such as a tubular or a longitudinal housing 1, including a longitudinal slot 12 formed therein, and including a graduation or a length indicia 13 provided beside the slot 12, and including an inner thread 15 formed in the bottom portion thereof, and including an opening 11 formed in the upper portion thereof and communicating with the upper end of the slot 12, and including an orifice 14 and an aperture 16 formed in the upper portion thereof for receiving a rod 3 and a wing or a bail 9, respectively. The bail 9 may be used for securing the scale to a key ring or for hanging purposes. The rod 3 has two ends to be supported on a supporting member for supporting the scale in place when required. A plug 2 is secured in the upper end of the housing 1 and includes an orifice 21 and an aperture 22 formed therein for receiving the rod 3 and the bail 9 respectively, for allowing the plug 3 to be solidly secured in the upper portion of the housing 1 without additional fasteners. The plug 2 may shield or block the opening 11 of the housing 1 when the plug 2 is engaged into the housing 1.

A cap 7 includes an outer thread 71 for threading with the inner thread 15 of the housing 1 and includes a peripheral lip 73 extended radially outward from the bottom portion thereof for engaging with the housing 1 and for limiting the engagement of the cap 7 into the housing 1 and for preventing the cap 7 from being completely engaged into the housing 1. A clamping ring 74 or the like may further be engaged between the housing 1 and the cap 7 for securing the cap 7 to the housing 1 or for preventing the cap 7 from being easily rotated relative to the housing 1 after the cap 7 is engaged and secured into the housing 1. The cap 7 includes a bore 72 formed therein for slidably receiving a stem 8 which includes a hook 81 provided on the bottom portion thereof and which includes an outer thread 82 formed in the upper portion thereof. The upper portion of the stem 8 is extended through a hole 42 of a shaft 4 and is threaded to a fastener nut 83 for securing the shaft 4 on the stem 8 and for preventing the shaft 4 from being disengaged from the stem 8. The shaft 4 is preferably engaged in the spring 6 for straightening the spring 6. The upper end of the stem 8 may further be secured to the head 41 when required. But, as shown in the drawings, the head 41 is not required to be secured to the stem 8, but may be biased to engage with the fastener nut 83 that is secured on the upper end of the stem 8, and may be moved in concert with the stem 8.

The shaft 4 includes a head 41 provided on the upper portion thereof and having a size greater than that of the shaft 4; or, alternatively, the head 41 includes a shaft 4 extended downward therefrom and slidably engaged onto the stem 8. A spring 6 is engaged on the stem 8 and engaged between the head 41 and the cap 7 for biasing the head 41 upward or away from the cap 7. An indicator 43 has a leg or projection 431 engaged into a hole 411 that is formed in the head 41, and is slidably engaged in the slot 12 of the housing 1 for aligning and for indicating the position of the head 41 relative to the indicia 13 when the head 41 is pulled downward against the spring 6 by the stem 8. A follower 5 is slidably engaged in the slot 12 of the housing 1 and includes a pair of opposite notches 51 formed therein for receiving the wall of the housing 1. The follower 5 is force-fitted onto the housing 1 for allowing the follower 5 to be slided along the slot 12 of the housing 1 and to be positioned to the housing 1 when no external force is applied onto the follower 5. The follower 5 may be engaged into the housing 1 and slidably engaged with the slot 12 of the housing 1 via the opening 11 of the housing 1 before the plug 2 is engaged into the housing 1. The plug 2 thus may be used to prevent the follower 5 or the indicator 43 from being disengaged from the housing 1.

Figure 4:
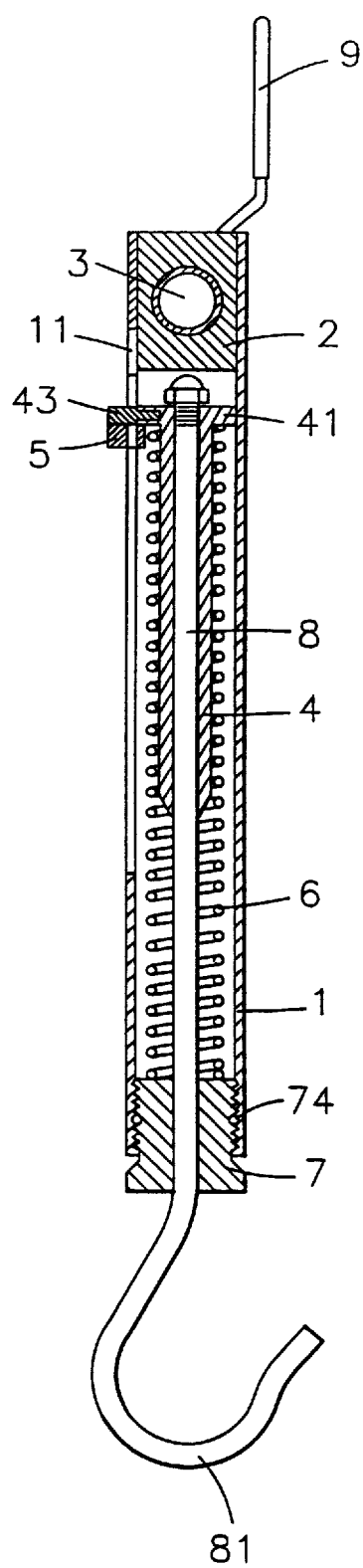
FIG. 4 is a cross sectional view taken along lines 4—4 of FIG. 2.

In operation, as shown in FIGS. 2–4, when an object to be weight is hooked to the hook 81, the follower 5 may be moved downward along the slot 12 of the housing 1 by the head 41 against the spring 6. Either or both of the indicator 43 and the follower 5 may be aligned with the indicia 13 for indicating the weight of the object. When the object is disengaged from the hook 81, the indicator 43 and the head 41 may be biased away from the cap 7 backward to the original position. The follower 5 may stay at the position and will not be moved relative to the housing 1 without any external force, such that the user may easily read the weight of the object even when the object has been removed from the scale. After weighing operation, the follower 5 may be moved backward to engage with the indicator 43 again for further use.

It is to be noted that the cap 7 and the spring 6 and the head 41 may be secured onto the stem 8 before the stem 8 and the head 41 and the spring 6 are engaged into the housing 1, such that the elements of the scale may be easily assembled. The indicator 43 may be secured to the head 41 after the head 41 is engaged into the housing 1. Without the indicator 43, the follower 5 may also be moved by the head 41 directly. Or, without the indicator 43 and the follower 5, the head 41 itself may be aligned with the graduation 13 for indicating the weight of the object.

Accordingly, the portable scale in accordance with the present invention includes a configuration to be easily manufactured and assembled.

Although this invention has been described with a certain degree of particularity, it is to be understood that the present disclosure has been made by way of example only and that numerous changes in the detailed construction and the combination and arrangement of parts may be resorted to without departing from the spirit and scope of the invention as hereinafter claimed.

I claim:

1. A scale comprising:
    a housing including a graduation provided thereon, and including an upper portion and a lower portion, said housing including a slot formed therein,
    a cap detachably secured to said lower portion of said housing,
    a stem slidably engaged through said cap and including a lower portion having a hook provided thereon for engaging with an object to be weighed, and including an upper portion slidably received in said housing,
    a head engaged on said upper portion of said stem and moved in concert with said stem for aligning with said graduation and for indicating a weight of the object,
    means for biasing said head and said upper portion of said stem away from said cap,
    a follower slidably engaged in said slot of said housing and engaged with said head and to be moved along said slot of said housing by said head for aligning with said graduation and for indicating the weight of the object, and
    an indicator secured to said head and moved in concert with said head for aligning with said graduation and for indicating the weight of the object, said indicator being engaged with said follower for moving said follower along said slot of said housing.

2. The scale according to claim 1, wherein said stem includes a fastener secured to said upper portion thereof and engaged with said head for preventing said head from being disengaged from said stem.

3. The scale according to claim 1, wherein said biasing means includes a spring engaged between said head and said cap.

4. The scale according to claim 3, wherein said head includes a shaft extended therefrom and engaged into said spring for straightening said spring.

5. The scale according to claim 1 further comprising an indicator secured to said head and moved in concert with said head for aligning with said graduation and for indicating the weight of the object.

6. The scale according to claim 1, wherein said housing includes an opening formed in said upper portion thereof and communicating with said slot of said housing for receiving said follower and for allowing said follower to be engaged into said slot.

7. The scale according to claim 6 further comprising a plug secured in said upper portion of said housing and engaged with said opening of said housing for shielding said opening of said housing.

8. The scale according to claim 1 further comprising a rod laterally engaged through said upper portion of said housing for hanging purposes.

9. The scale according to claim 1 further comprising a bail secured to said upper portion of said housing for hanging purposes.

10. The scale according to claim 1, wherein said cap includes a bottom portion having a peripheral lip extended radially outward therefrom for engaging with said housing and for preventing said cap from being engaged into said housing.

11. The scale according to claim 1, wherein said bottom portion of said housing includes an inner thread formed therein, said cap includes an outer thread threaded with said inner thread of said housing.

12. The scale according to claim 11 further comprising means for securing said cap to said housing.

* * * * *